Jan. 10, 1967 F. DEKKER 3,297,272

MEANS TO WIND A FLEXIBLE STRIP

Filed Dec. 20, 1963

INVENTOR:
Frank Dekker

By Smyth, Roston & Pavitt
Attorneys

United States Patent Office 3,297,272
Patented Jan. 10, 1967

3,297,272
MEANS TO WIND A FLEXIBLE STRIP

Frank Dekker, Inglewood, Calif., assignor to Minnesota Mining and Manufacturing Company, St. Paul, Minn., a corporation of Delaware
Filed Dec. 20, 1963, Ser. No. 332,017
6 Claims. (Cl. 242—74.2)

This invention relates to a reel for handling a flexible strip such as a magnetic recording tape or a motion picture film and, more particularly, relates to means to facilitate the initial engagement of the flexible strip with the reel in preparation for winding the strip on the reel.

A conventional reel for magnetic recording tape, for example, has a hollow hub with a slot therein to receive the end of the tape. The slot loosely retains the end of the tape until the reel is rotated enough to wind one full turn of the tape on the hub and thereafter the tension of the tape tends to tighten the winding on the hub to keep the tape connected to the reel in an effective manner. Unfortunately, however, such a slot placed in the hub for initial loose engagement with the end of the tape is not readily accessible because it is flanked by the closely spaced radially extensive sides or flanges of the reel. Consequently it is an awkward time-consuming matter to thread the end of the tape into the slot.

The present invention meets this problem by providing a tape-engaging member that is separate from tthe hub and is freely movable along a predetermined path between an outermost fully accessible position near the periphery of the reel and an innermost postion at the hub. Preferably the hub is recessed to permit the member to lie substantially entirely within the circumference of the hub at the innermost position of the member.

The invention takes advantage of the fact that such a predetermined path for free movement of the tape-engaging member changes in orientation with rotation of the reel and thus swings through a range of 360° of angles relative to any given direction from which the flexible strip may extend to the reel. The important fact is that at some of these angles the tension of the tape from the given direction urges the tape-engaging member towards its innermost position and at other angles the tension of the tape from the given direction urges the tape-engaging member towards its outermost position. In the preferred practice of the invention the tension of the tape from the given direction is utilized to move the tape-engaging member automatically to its innermost position in response to initial rotation of the reel in the tape winding direction and, subsequently, when the rotation of the reel is reversed to unwind the tape, the tension of the tape from the given direction is utilized to move the tape-engaging member from its innermost position to its outermost position automatically when the last turn of the wound tape is reached.

If the tape-engaging member were to remain at its innermost position when the tape is fully unwound, the tape-engaging member may cause the tape to be wound on the hub in the opposite direction as the reverse rotation of the reel continues by inertia after the unwinding is completed; the automatic movement of the strip-engaging member to its outermost position at the end of the unwinding operation insures release of the tape with no tendency for the tape to start to wind in the opposite direction. Thus the invention takes advantage of the fact that the high peripheral speed of the reel favors release of the strip from the strip-engaging member when the strip-engaging member is moved to its outermost position.

The preferred practice of the invention is further characterized by provision of a biasing force to urge the strip-engaging member outward from its innermost position to insure that the outward movement occurs automatically as the unwinding action reaches the end of the strip. One provision for such outward biasing that may be used is to associate sufficient mass with the strip-engaging member to create an effective outward centrifugal force in response to the unwinding rotation of the reel. Another biasing means that may be employed is a suitable spring means that is stressed to urge the strip-engaging member towards its outermost position. In the practice of the invention selected for the present disclosure, the strip-engaging member is mounted on an arm that adds a mass for creating centrifugal force and, in addition, suitable spring means urges the arm outward.

A feature of the invention is the concept of automatically increasing the effectiveness of the engagement of the member with the end of the flexible strip in response to the movement of the member to its innermost position. For this purpose, the strip-engaging member is provided with a transverse slot to receive the end of the flexible strip with an end portion of the strip extending beyond the slot. When the strip-engaging member moves into the recess in the hub it automatically clamps the free end portion of the strip against the surface of the recess to increase the effectiveness of the anchorage of the end of the strip to the reel. When the reel is subsequently rotated in the unwinding direction and the strip-engaging member moves automatically outwardly, the clamping action is automatically terminated to favor release of the strip.

At first thought it would seem that an inherent disadvantage of the present invention would be that the cost of the reel would greatly exceed the cost of conventional reels. A conventional reel is of economical construction because it has no relatively movable parts and because it is adapted for mass production by automatic machinery. This disadvantage has been encountered in various attempts in the prior art to accomplish the purpose of the present invention by the addition of movable parts to reel construction.

A feature of the present invention, however, is that this disadvantage is avoided by mounting all of the moving parts on the drive means that engages the reel. Thus in the preferred practice of the invention the reel differs from a conventional reel merely in the provision of registered arcuate slots in the two flanges of the reel and the provision of a recess in the hub at the inner ends of the two slots. The strip-engaging member is a pin or post on the end of an arm that is pivotally mounted on the drive means to extend through the two side flanges of the reel and to move along the pair of arcuate slots of the reel.

The features and advantages of the invention may be understood from the following detailed description and the accompanying drawing.

In the drawing, which is to be regarded as merely illustrative:

FIG. 1 illustrating the presently preferred practice of the invention is a plan view of a drive means that is adapted to support and rotate a reel of the character described, the drive means being provided with a spring-biased arm with a strip-engaging member on the swinging end of the arm;

Figure 4:
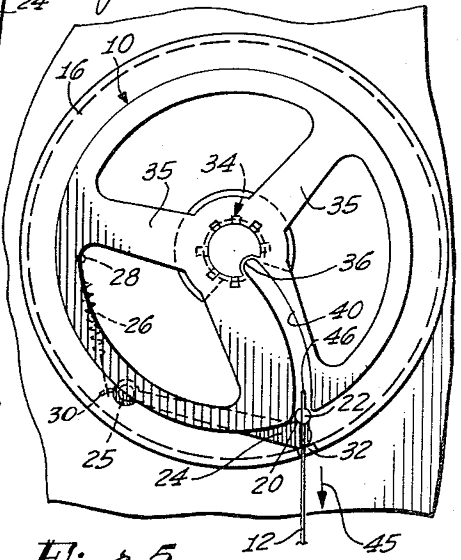
Figure 5:
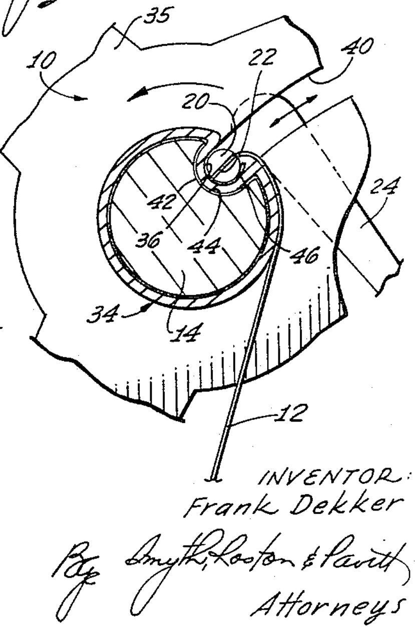

FIG. 4 is a similar view showing how the tension of the flexible strip pulls the strip-engaging member to its outermost position when the end of the strip is reached in the course of the unwinding of the strip from the reel; and FIG. 5 is an enlarged fragmentary plan view, partly in section, showing how the strip-engaging member clamps the free end of the strip against the surface of the recess in the hub of the reel.

The drawing illustrating the presently preferred embodiment of the invention shows, by way of example, a portion of a tape handling or tape transport mechanism the purpose of which is to rotate a reel 10 to wind a flexible strip 12 onto the reel. The mechanism includes driving means to support and rotate the reel 10 and, in the construction shown, the driving means includes an upright drive shaft 14 with an upper relatively small disk 15 and a lower larger disk 16 mounted on the drive shaft and keyed thereto by a suitable spline 18. The upper end of the shaft 14 together with the small disk 16 serves as means to receive and support the reel 10. The upper smaller disk 15 spaces the reel from the lower larger disk 16 and the lower larger disk carries the required member that is adapted to releasably engage the end of the flexible strip or tape.

Figure 1:
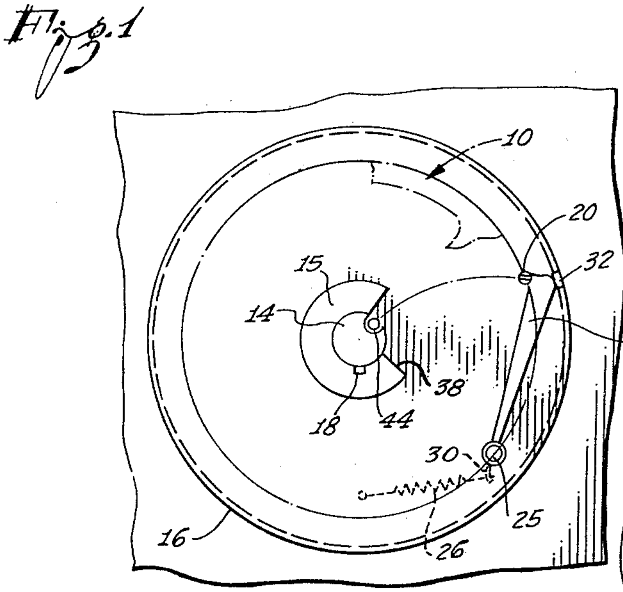
Figure 2:
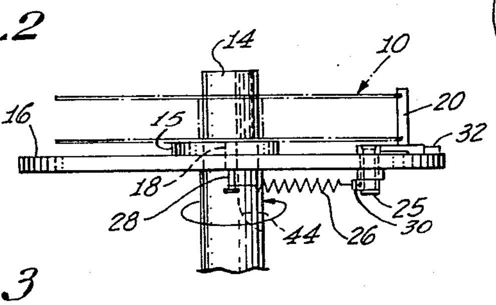
FIG. 2 is an elevational view of the drive means in FIG. 1 showing in phantom how a reel rests on the drive means.

In the construction shown, the strip-engaging member is in the form of an upright pin or post 20 that is formed with a diametrical solt or kerf 22 to receive the tape. The pin 20 is mounted on the outer end of a swingable arm 24 that is pivoted on an axis that is spaced radially outwardly from the drive shaft 14. In the construction shown the arm 24 swings along the upper surface of the disk 16 and is fixedly connected to a pivot pin 25 that is journalled in a corresponding bore in the lower disk 16. Thus the tape-engaging pin 20 is movable along a predetermined arcuate path from an outermost position adjacent the periphery of the reel shown in FIGS. 1, 2 and 4 and an innermost position which is shown in FIG. 5.

Preferably suitable resilient yielding means is provided to bias the tape-engaging pin 20 towards its outermost position. Such a means may comprise a coiled tension spring 26 having one of its ends anchored to a pin 28 on the underside of the disk 16 and having its other end attached to a short radial arm 30 that is fixedly mounted on the pivot pin 25. Thus the arms 24 and 30 are, in effect, opposite arms of a lever. A suitable stop lug 32 on the disk 16 limits the outward movement of the arm 24 at the previously mentioned outermost position of the tape-engaging pin 20.

The reels that are to be used interchangeably on the described driving means may be of the construction of the reel 10 shown in the drawing. The reel 10 has a hollow or tubular hub 34 on the opposite ends of which are mounted the usual side wall or radial flanges 35, the spacing between the two radial flanges being slightly greater than the width of the tape 12.

The reel 10 differs from conventional reels in only two respects. In the first place the cylindrical wall of the hub 34 is offset inwardly to form a longitudinal peripheral recess 36 to seat the tape-engaging pin 20. Preferably the recess 36 is deep enough for the tape-engaging pin 20 to lie completely within the outer circumference of the tubular hub. As may be seen in FIG. 1, a substantial portion of the disk 15 is cut away as indicated at 38 to permit the arm 24 to swing inwardly far enough to place the tape-engaging pin 20 in the recess 36.

The second respect in which the reel 10 differs from a conventional reel is that the two radial side flanges 35 of the reel are cut away to clear the arcuate path of the movement of the tape-engaging pin 20. In the construction shown, each of the two radial side flanges 35 is formed with an arcuate slot 40, the two arcuate slots being aligned with each other to permit the tape-engaging pin 20 to extend through the planes of the two radial side flanges. Thus when a reel 10 is mounted on the drive shaft 14, the tape-engaging pin 20 protrudes above the reel to permit the tape-engaging pin to be manipulated in a convenient manner whenever desired.

It is essential that the reel 10 be engaged in a positive manner for rotation by the drive means. A feature of the invention in this regard is that the inwardly offsetting of the cylindrical wall of the reel hub 34 forms a spline 42 by means of which the drive shaft may engage the reel in a positive manner. In the construction shown, the drive shaft is formed with a longitudinal groove 44 that is dimensioned to receive the spline 42 in a sliding manner. Thus the offset in the cylindrical wall of the reel hub has the dual function of providing the longitudinal recess 36 to receive the tape-engaging pin 20 and of further providing the spline 42 for engagement by the drive shaft 14. It is to be further noted that the engagement of the spline 42 of the reel with the longitudinal groove 44 of the drive shaft 14 automatically orients the reel to register the two arcuate slots 40 with the tape-engaging pin 20.

The manner in which the mechanism functions for its purpose may be readily understood from the foregoing description. When the drive shaft 14 is idle, the spring 26 holds the arm 24 at its outermost position against the stop lug 32 as shown in FIGS. 1–4. With a reel 10 mounted on the drive means and with a tape 12 extending towards the reel from the direction indicated by the arrow 45 in FIG. 4, the accessibility of the tape-engaging pin 20 at the outer periphery of the reel makes it simple and convenient to slide the end of the tape into the kerf 22 in the manner shown in FIG. 4. It will be noted in FIG. 4 that the end portion 46 of the tape extends beyond the kerf. It will also be noted in FIGS. 4 and 5 that the kerf is so oriented as to direct the free end portion 46 of the tape towards the hub recess 36.

With the tape initially engaged by the tape-engaging pin 20, the operator has a choice of two procedures.

In one procedure, the operator provides slack in the tape 12 and applies finger pressure to the exposed end of the tape-engaging pin 20 to shift the pin to the innermost position shown in FIG. 5. It will be noted in FIG. 5 that at this innermost position of the tape-engaging pin 20 the end portion 46 of the tape is doubled back and is clamped against the inner surface of the recess 36 by the tape-engaging member 20. The operator may initially provide finger pressure to create the cramping action on the end of a tape. With the tape engaging pin 20 seated in the recess 36 under finger pressure and with the reel in the position shown in FIG. 4, the operator may rotate the reel counterclockwise until at least one turn of the tape 12 is wound onto the hub 34 to confine the tape-engaging pin 20. With slightly more than one full turn of the tape 12 on the reel hub 34 it is apparent that placing the tape 12 under tension has the desirable effect of tightening the tape winding on the hub for highly effective attachment of the tape end to the reel. The drive shaft 14 may then be actuated counterclockwise to wind the tape 12 on the reel.

Figure 3:
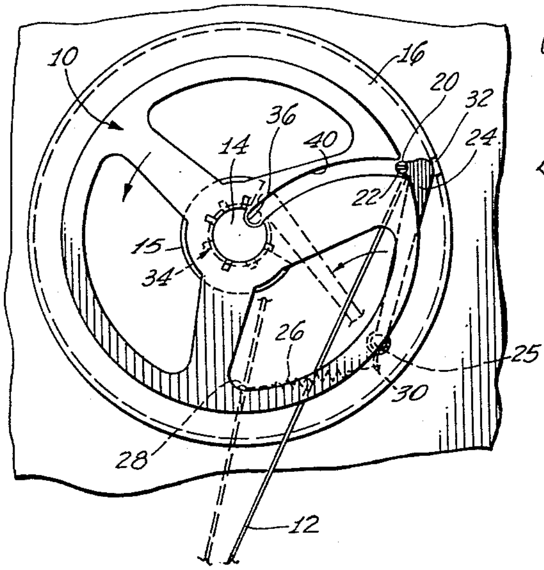
FIG. 3 is a plan view of a reel on the drive means with the strip-engaging member in engagement with the end of a flexible strip, the view illustrating the procedure for initiating the winding of the flexble strip on the reel.

The second or alternate procedure is to rely on the tension or resistance to pull on the part of the tape to shift the tape-engaging pin 20 automatically from its outermost position to its innermost position. For this purpose the kerf of the tape-engaging pin 20 grips the end of the tape with sufficient static friction to withstand a certain amount of tension on the part of the tape. With the tape engaged by the tape-engaging pin 20 and with the reel 10 in the position shown in FIG. 4, the operator simply rotates the reel in the desired direction which in this instance is counterclockwise. It is apparent that when the slots 40 reach an angular position with respect to the direction of the tape 12 such as the angular position shown in FIG. 3, the tension of the tape will create an effective component of force along the axis of the two slots 40 to pull the tape-engaging pin 20 into the hub recess 36. In other words when the tensioned tape 12 swings past "center" i.e. past the axis of the pivot pin 25 as shown in FIG. 3 the tension of the tape creates a turning moment on the arm 24 to urge the arm radially inwardly. Thus the second procedure, starting with the parts positioned as shown in FIG. 4, the operator merely rotates the reel counterclockwise until at least slightly more than one full turn of the tape is wound onto the hub of the reel.

After the tape 12 is wound onto the reel 10 to the desired extent, usually to the extent of nearly filling the reel, the drive shaft 14 is released for reverse rotation and the tape is wound in the usual manner onto a second power driven reel (not shown) whereby the pull of the tape causes the reel 10 to rotate in the clockwise or unwinding direction. As the reel 10 rotates in the unwinding direction two different forces urge the tape-engaging pin 20 radially outward so that as soon as the last turn of the tape is unwound to free the tape-engaging pin from confinement, the tape-engaging pin snaps automatically to its outermost position. One of these forces is, of course, the force exerted by the spring 26. The other force is centrifugal force acting on the tape-engaging pin 20 and acting especially on the associated mass of the arm 24.

The outward movement of the tape-engaging pin 20 raises the speed of travel of the pin from the peripherial speed of the hub 34 to the peripherial speed of the outer circumference of the reel, and this higher peripherial speed encourages disengagement of the tape from the pin 20. It is also to be noted that the impact of the outwardly swinging arm 24 against the stoplug 32 is highly effective to overcome the static friction of the engagement of the pin 20 with the tape. Consequently the tape automatically pulls free from the tape-engaging pin 20.

My description in specific detail of the selected embodiment of the invention will suggest various changes, substitutions and other departures from my disclosure within the spirit and scope of the appended claims.

I claim:

1. In an apparatus for handling a flexible strip, for example a magnetic recording tape, the combination of:
- a reel having a hub with a recess in the periphery of the hub;
- a member separate from the hub adapted to releasably engage one end of the strip;
- an arm fixedly carrying the strip-engaging member, the arm being pivoted to carry the member along a predetermined arcuate path between an outermost accessible position adjacent the periphery of the reel and an innermost position nested into the recess of the hub; and resilient yielding means biasing the arm from its innermost position to its outermost position whereby when the strip-engaging member is released from confinement by unwinding of the strip, the arm automatically swings the member to its outermost position.

2. In an apparatus for handling a flexible strip, for example a magnetic recording tape, the combination of:
- a reel having a hub for the winding of the strip thereon and further having two opposite end flanges to cooperate with the opposite longitudinal edges of the strip to confine the wound strip, said hub having a longitudinal peripheral recess;
- drive means adapted to engage and support the reel to drive the reel for winding of the strip on the reel;
- pivot means carried by the drive means eccentrically thereof;
- an arm pivoted on the pivot means;
- a member adapted for releasable engagement with the end of the strip, the member being rigidly mounted on the arm for movement by the arm along a predetermined arcuate path between an outer accessible position near the periphery of the reel and an inner position seated in the recess of the hub;
- whereby to prepare for winding the strip from a given direction, the member may be placed at its outer position for engagement with an end of the strip and may then be moved to its inner position to be enclosed and retained by initial winding of the strip on the hub;
- the two end flanges of the reel being slotted to clear the arcuate path and the member being dimensioned to extend through both slots and project beyond one face of the reel for convenient manipulation; and
- spring means acting on the arm to move said member from its inner position to its outer accessible position.

3. In an assembly of a driving means and a reel thereon for winding a flexible strip, wherein a strip-engaging member is swingable from an outer position to an inner position at the hub of the reel for initiating winding of the strip, the improvement to reduce the cost of the reel and to make it possible to use inexpensive reels interchangeably, comprising:
- the reel being movably mounted on the driving means;
- the strip-engaging member being fixedly mounted on an arm for movement of the strip-engaging member between its two positions, said arm being pivotally mounted on the driving means as distinguished from the reel itself;
- the reel being slotted for clearance along the arcuate path of the strip-engaging member; and
- spring means continuously biasing the arm from its innermost position to its outermost position whereby the arm returns to its outermost position automatically when the flexible strip is unwound from the reel.

4. An improvement as set forth in claim 3 in which the reel has two coextensive slots on its opposite sides, respectively; and
- in which the strip-engaging member extends through both slots and beyond the outer face of the reel to make the strip-engaging member accessible for manipulation along the whole of its path between its two positions.

5. In an assembly of a driving means and a reel thereon for winding a flexible strip, wherein a strip-engaging member is swingable from an outer position to an inner position at the hub of the reel for initiating winding of the strip, the improvement to reduce the cost of the reel and to make it possible to use inexpensive reels interchangeably, comprising:
- the driving means having a shaft to telescope into the hub of the reel, the hub of the driving means having a longitudinal peripheral groove;
- the hub of the reel being in the form of a circumferential wall formed with a reentrant portion to slidingly engage said longitudinal groove for keying the reel to the hub of the driving means;
- said reentrant portion of the wall of the hub of the reel forming a recess to receive said strip-engaging member within the diameter of the hub of the reel;
- said strip-engaging member being mounted on an arm to move in an arcuate path between its two positions, said arm being pivotally mounted on the driving means as distinguished from the reel; and
- the reel being slotted to provide clearance for the strip-engaging member along its arcuate path.

6. In an apparatus for handling a flexible strip, for example a magnetic recording tape, the combination of:
- a reel having a hub for the winding of the strip thereon and further having two opposite end flanges to cooperate with the opposite longitudinal edges of the strip to confine the wound strip, said hub having a longitudinal peripheral recess;
- drive means adapted to engage and support the reel to drive the reel for winding of the strip on the reel;
- pivot means carried by the drive means eccentrically thereof;
- an arm pivoted on the pivot means; and
- a member adapted for releasable engagement with the end of the strip, the member being rigidly mounted on the arm for movement by the arm along a predetermined arcuate path between an outer accessible position near the periphery of the reel and an inner position seated in the recess of the hub, whereby to prepare for winding the strip from a given direction, the member may be placed at its outer position for engagement with an end of the strip and may then be moved to its inner position to be enclosed and retained by initial winding of the strip on the hub, the two end flanges of the reel being slotted to clear the arcuate path and the member being dimensioned to extend through both slots and project beyond one face of the reel for convenient manipulation, said member having a kerf to receive the end of the strip, the kerf being oriented towards the recess whereby with the end of the strip in the kerf and a free end portion of the strip extending beyond the kerf, the member may be moved into the recess to clamp the free end portion against the surface of the recess.

References Cited by the Examiner

UNITED STATES PATENTS

| | | | |
|---|---|---|---|
| 793,672 | 7/1905 | Lyter | 242—74.1 |
| 886,582 | 5/1908 | Davies. | |
| 1,261,872 | 4/1918 | Tomkins | 242—74.1 |
| 1,871,234 | 9/1932 | Proctor | 242—74 |
| 1,920,657 | 9/1933 | Morsbach | 242—74 |
| 3,072,355 | 1/1963 | Faulkner, et al. | 242—74.2 |

FRANK J. COHEN, *Primary Examiner.*

STANLEY N. GILREATH, MERVIN STEIN, *Examiners.*

W. S. BURDEN, *Assistant Examiner.*